United States Patent
Chen et al.

(10) Patent No.: US 7,410,300 B2
(45) Date of Patent: Aug. 12, 2008

(54) ADJUSTING STRUCTURE FOR ADJUSTING AMOUNT OF LUBRICANT APPLIED TO A LINEAR GUIDEWAY

(75) Inventors: Jen-Sheng Chen, Taichung (TW); Hsin-Tsun Hsu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 281 days.

(21) Appl. No.: 11/307,665

(22) Filed: Feb. 16, 2006

(65) Prior Publication Data
US 2007/0189645 A1   Aug. 16, 2007

(51) Int. Cl.
*F16C 29/06* (2006.01)

(52) U.S. Cl. .......................... 384/13; 384/45
(58) Field of Classification Search ............ 384/13, 384/15, 43–45
See application file for complete search history.

(56) References Cited

U.S. PATENT DOCUMENTS

| | | | |
|---|---|---|---|
| 5,380,097 A * | 1/1995 | Tanaka ..................... 384/13 |
| 5,399,023 A * | 3/1995 | Winkelmann et al. ......... 384/13 |
| 5,547,285 A * | 8/1996 | Hutzel et al. .................. 384/15 |
| 6,019,513 A * | 2/2000 | Tsukada et al. ............... 384/15 |
| 6,123,457 A * | 9/2000 | Suzuki et al. ................. 384/13 |
| 6,250,804 B1 * | 6/2001 | Hsu et al. ...................... 384/13 |
| 6,401,867 B1 * | 6/2002 | Michioka et al. .............. 184/5 |
| 2007/0172158 A1 * | 7/2007 | Chen et al. .................... 384/13 |

* cited by examiner

*Primary Examiner*—Thomas R Hannon
(74) *Attorney, Agent, or Firm*—Banger Shia

(57) ABSTRACT

An adjusting structure for adjusting amount of lubricant applied to a linear guideway comprises a self-lubricating oil tank, a positioning board and at least one adjusting board. The self-lubricating oil tank is fixed on the slide block, and the self-lubricating oil tank has an oil-storage space and a lubricating unit. The adjusting board and the positioning board are superposed and arranged between the oil-storage space and the lubricating unit. The displacement of the adjusting board can change the size of the aligned apertures of the positioning board and the adjusting board, and can precisely adjust the amount of lubricating oil transmitted from the oil-storage space to the lubricating unit. Therefore, the present invention can use the adjusting board to change the lubricating effect at any time, it not only can save lubricating oil but also can improve the lubricating effect.

3 Claims, 7 Drawing Sheets

ADJUSTING STRUCTURE FOR ADJUSTING AMOUNT OF LUBRICANT APPLIED TO A LINEAR GUIDEWAY

BACKGROUND OF THE INVENTION

1. Field of the Invention

The present invention relates to a linear guideway lubricating equipment, and more particularly to an adjusting structure for adjusting amount of lubricant applied to a linear guideway, wherein a positioning board and an adjusting board are disposed in the oil tank for adjusting the lubricating oil transmitted from the oil-storage space to the lubricating unit, it not only can save lubricating oil but also can improve the lubricating effect.

2. Description of the Prior Art

Since linear transmission products are being applied more and more widely in the modern industry, various linear transmission mechanisms have widely come into human life, manufacturing factory and high science and technology instruments, such as linear guideway, ball screw, and the like. Particularly in a large-scale precision mechanism are usually installed various large and small ball screws or linear guideway systems. Although the technology for linear transmission element is developing fast, consumers still need the technology to be improved uninterruptedly. Therefore, there are still some problems to be solved. And this desire for constant improvement of technology is particular strong in many high precision mechanism-manufacturing fields that require comparative stability and quiet. Hence, the existing linear mechanism still has some technological blind spots to be improved.

The existing linear guideway lubricating systems are generally divided into the following types:

A first type conventional linear guideway lubricating system disclosed by U.S. Pat. No. 6,019,513 is shown in FIG. 1, the cap 11 of the slide block 10 contains a lubricant-containing porous member 12 that directly contacts the linear guideway for applying lubricant to the ball groove thereof. However, this type lubricating system is impractical because of the following reasons:

First, the lubricating operation is becoming more and more precise, it requires the lubricating effect to be improved and the amount of applied lubricant to be adjustable. However, this lubricant-containing porous member 12 is able to adjust the amount of applied lubricant.

Second, in real use, it is impossible to calculate the quantity of the lubricant consumed by the lubricant-containing porous member 12. When the lubricant is used up, the user must check the lubricating effect at all times, therefore, it is not only time-consuming and laborsome, but also the lubricating efficiency is low.

A second type conventional linear guideway lubricating system disclosed by U.S. Pat. No. 6,401,867 B1 is shown in FIG. 2, wherein a self-lubricating unit 14 is disposed at an end of the slide block, and a lubricant-storage groove 141 is formed in the self-lubricating unit 14 for accommodation of a lubricant-containing material 142. The lubricant-containing material 142 serves to supply lubricant to the lubricating member 143, and then the lubricating member 143 contacts the rail 13 for carrying out lubricating operation. However, this lubricating system is also impractical due to the following reasons:

First, similarly, the lubricating operation is becoming more and more precise, it requires the lubricating effect to be improved and the amount of applied lubricant to be adjustable. However, the lubricating member 143 is able to adjust the amount of applied lubricant.

Second, in real use, it is impossible to calculate the quantity of the lubricant consumed by the lubricating member 143. When the lubricant is used up, the user must check the lubricating effect at all times, therefore, it is time-consuming and laborsome, and as a result, the lubricating efficiency is low.

Hence, with the popularization of the linear transmission application, the demand of solving the aforementioned problems is becoming more and more urgent, and manufacturing an easily maintained ball screw less with a good lubricating effect has become the most important selling point that the manufactures are striving for. Therefore, another two linear guideway lubricating systems were developed, which are explained below:

FIG. 3 shows a lubricating system disclosed by U.S. Pat. No. 6,123,457, wherein an oil tank 15 is installed at the end of the slide block for storage of lubricating oil 151, the lubricant 151 is transmitted to the ball groove of the rail 154 via a lubricating member 153 that is inserted in the discharging hole 152 of the oil tank 15. This lubricating system can effectively reduce the maintenance and checking time, however, the lubricating member 153 is also unable to adjust and control the quantity of lubricant 151 transmitted to the rail 154.

FIG. 4 shows a fourth conventional product disclosed by U.S. Pat. No. 6,250,804 B1, wherein a lubricant-storage hole 161 is formed on the slide block 16 and then a predetermined amount of lubricant is injected into the lubricant-storage hole 161 by an injection needle 17. And a wool felt 18 is received in the lubricant-storage hole 161 in such a manner that the wool felt 18 protrudes out the lubricant-storage hole 161 and contacts the rail 19. The wool felt 18 can absorb the lubricant to its protrusion based on the capillary theory, so that the lubricant will be transmitted to the balls, and then will be transmitted to the rail 19 by the balls. This lubricating system can effectively reduce the maintenance and checking time since the lubricant storage in the lubricant-storage hole 161 is observable. However, the formation of the lubricant-storage hole 161 must require a lot of times of drilling operation in the slide block 16, and it is also unable to adjust and control the quantity of lubricant 151 transmitted to the rail 19.

The present invention has arisen to mitigate and/or obviate the afore-described disadvantages.

SUMMARY OF THE INVENTION

The primary objective of the present invention is to provide an adjusting structure that can adjust the amount of lubricant applied to a linear guideway.

To achieve the abovementioned objective, the present invention installs a self-lubricating oil tank on the slide block, and the self-lubricating oil tank has an oil-storage space and a lubricating unit. An adjusting board and a positioning board are superposed and arranged between the oil-storage space and the lubricating unit. The displacement of the adjusting board can change the size of the aligned apertures of the positioning board and the adjusting board, and can precisely adjust the amount of lubricating oil transmitted from the oil-storage space to the lubricating unit. Therefore, the present invention can use the adjusting board to change the lubricating effect at any time, it not only can save lubricating oil but also can improve the lubricating effect.

The secondary objective of the present invention is to provide a simply structured, lubricant-saving and maintenance-saving adjusting structure for adjusting the amount of lubricant applied to a linear guideway, To achieve the abovementioned objective, the adjusting board and the positioning board are superposed and arranged between the oil-storage space and the lubricating unit. The displacement of the adjusting board can change the size of the aligned apertures of the positioning board and the adjusting board, and can precisely adjust the amount of lubricating oil transmitted from the oil-storage space to the lubricating unit. Therefore, the present invention can use the adjusting board to change the lubricating effect at any time, thus effectively saving lubricating oil and the maintenance period while improving the lubricating effect. Plus the present invention is simply structured without changing the design of the slide block. Therefore, the present invention is a simply structured, lubricant-saving and maintenance-saving lubricant amount adjusting structure.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
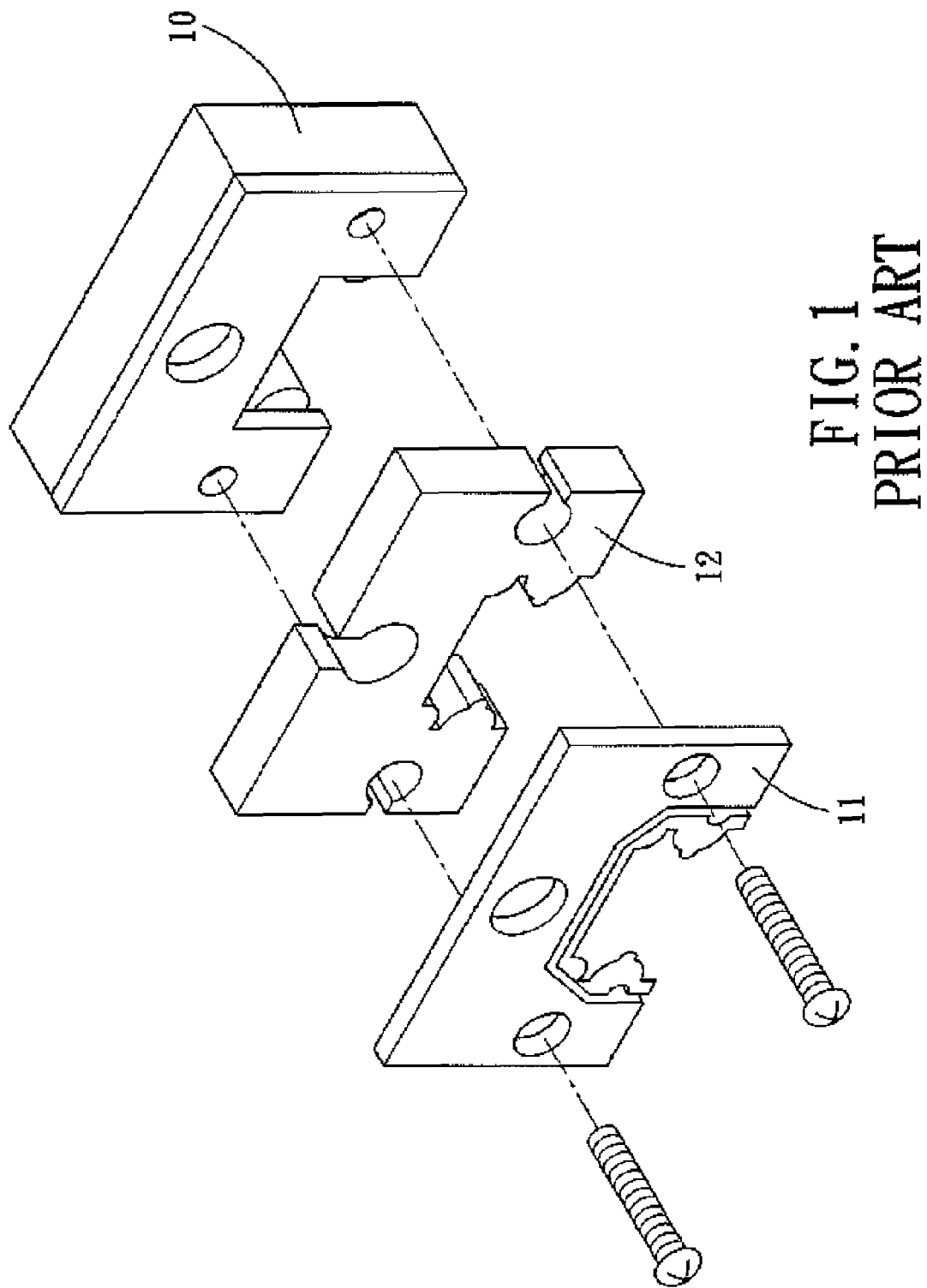
FIG. 1 is an exploded view of a conventional linear guideway lubricating system.
Figure 2:
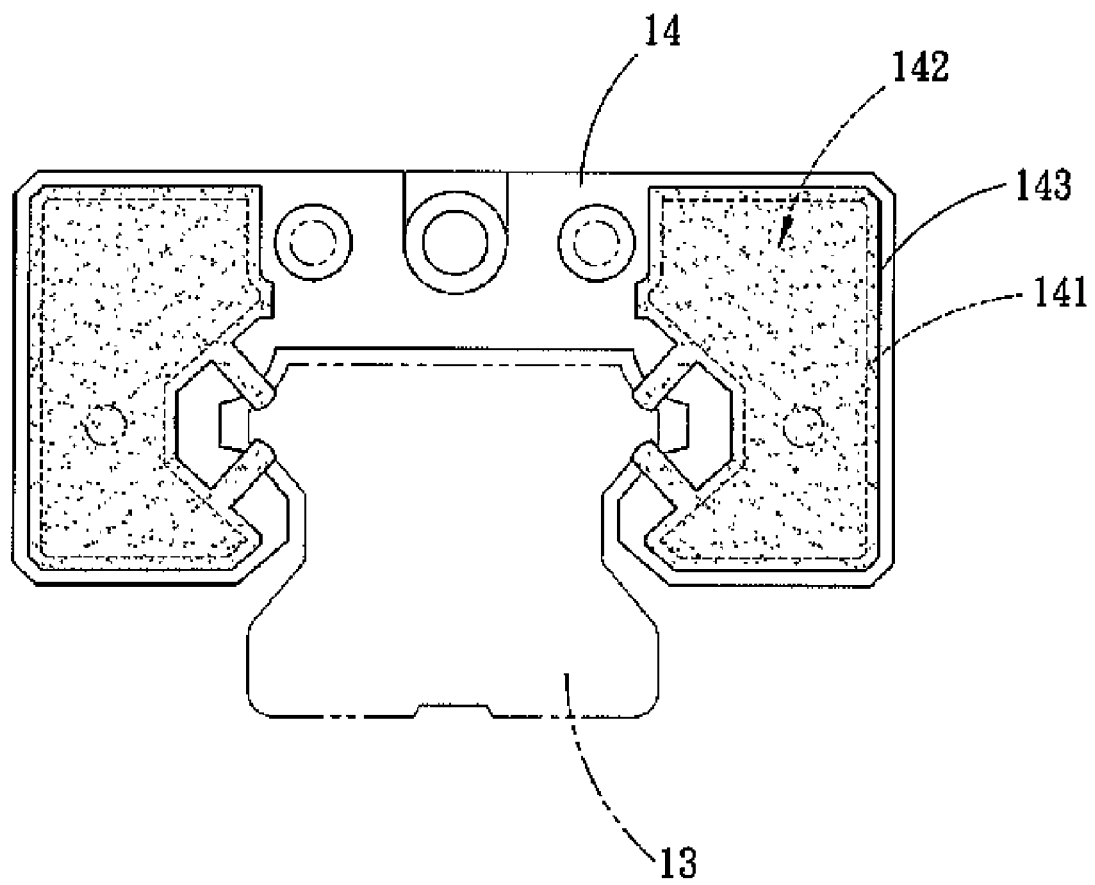
FIG. 2 is an assembly cross sectional view of a second conventional linear guideway lubricating system.
Figure 3:
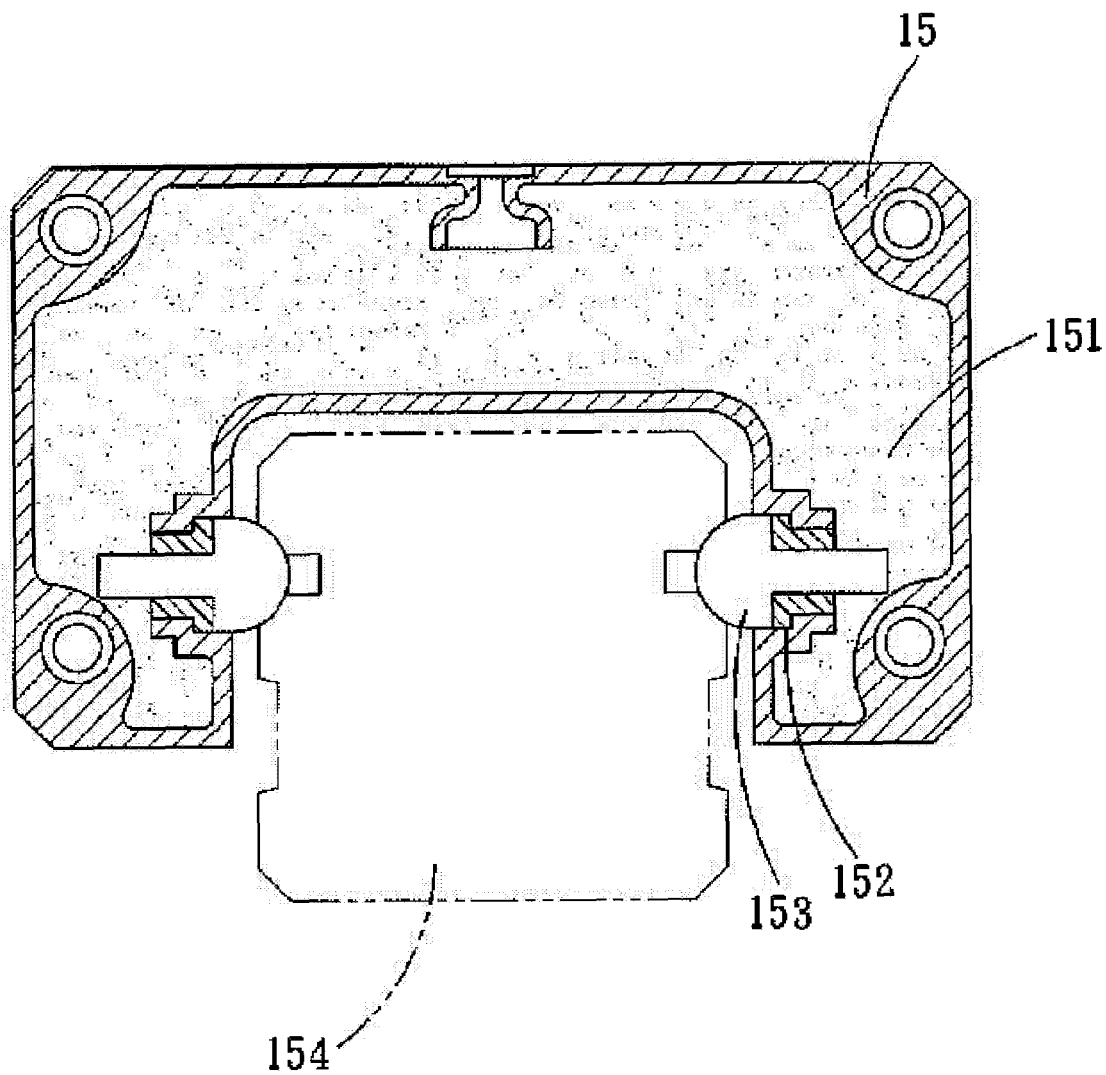
FIG. 3 is an assembly cross sectional view of a third conventional linear guideway lubricating system.
Figure 4:
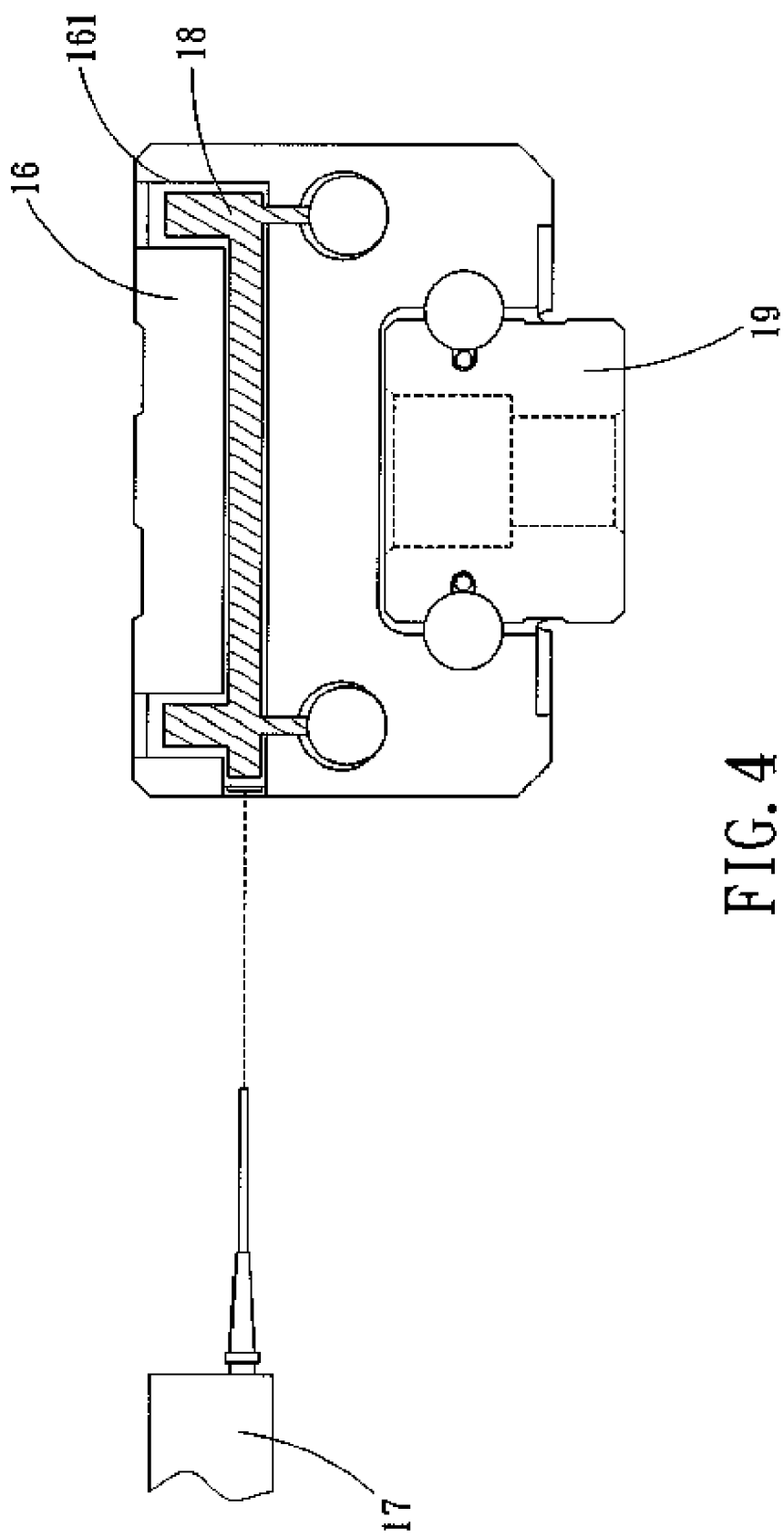
FIG. 4 is an operational view of a fourth conventional linear guideway lubricating system.
Figure 5:
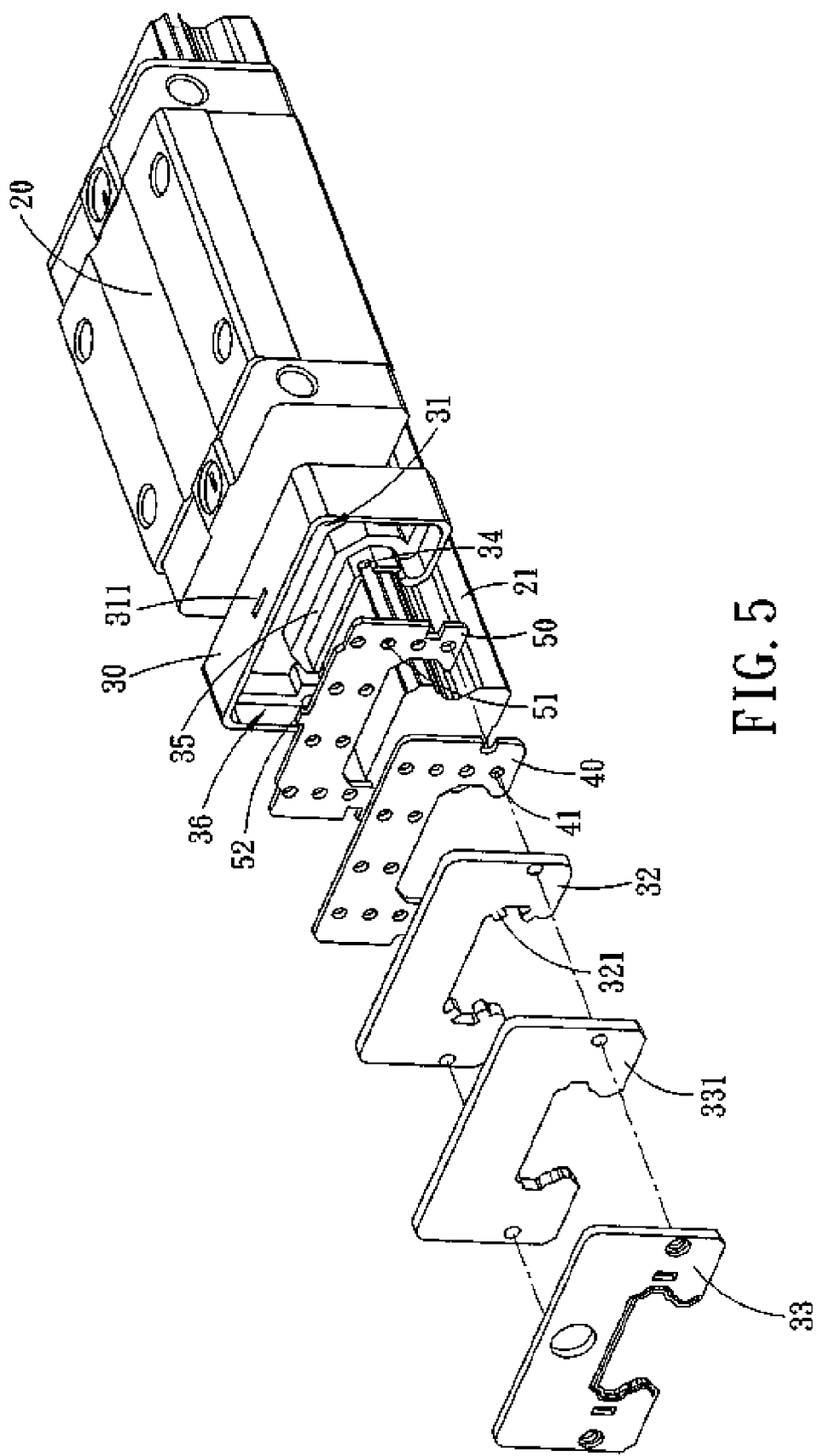
FIG. 5 is an exploded view of an adjusting structure for adjusting amount of lubricant applied to a linear guideway in accordance with a preferred embodiment of the present invention.
Figure 6:
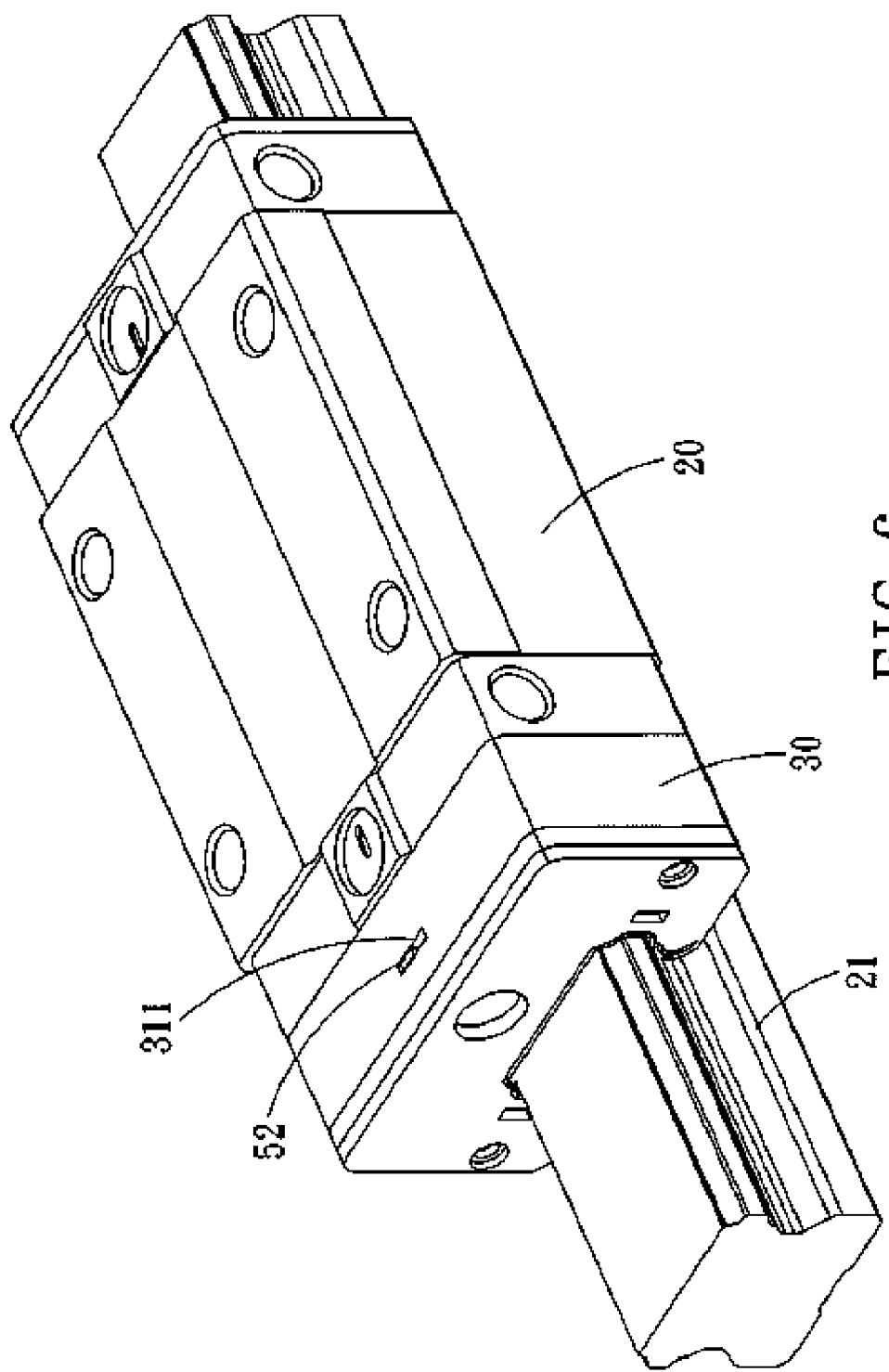
FIG. 6 is an assembly view of the adjusting structure for adjusting amount of lubricant applied to a linear guideway in accordance with the preferred embodiment of the present invention.
Figure 7:
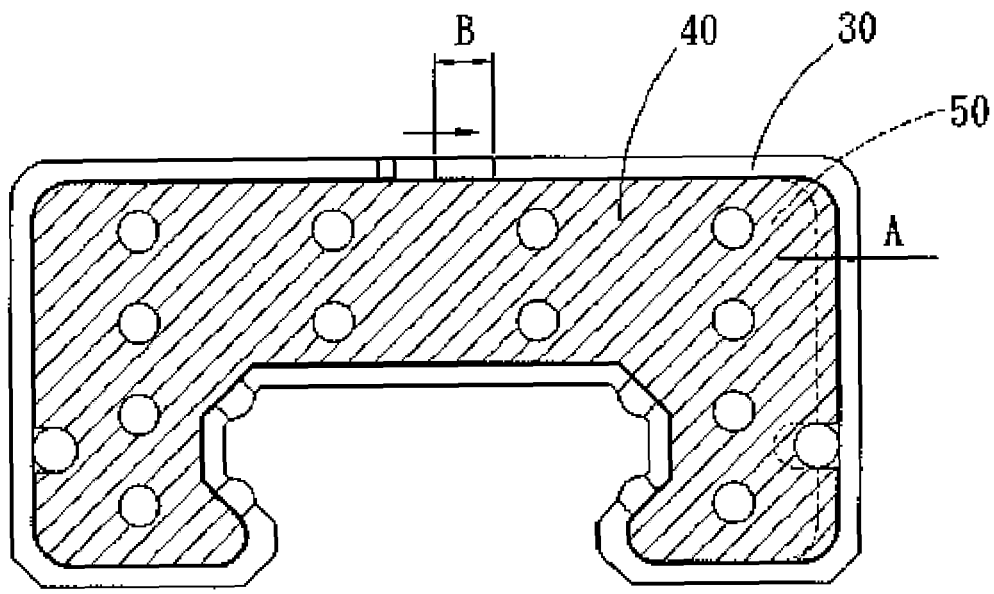
FIG. 7 is a cross sectional view in accordance with the preferred embodiment of the present invention of showing that the oil apertures of the positioning board are aligned to the oil apertures of the adjusting board.
Figure 8:
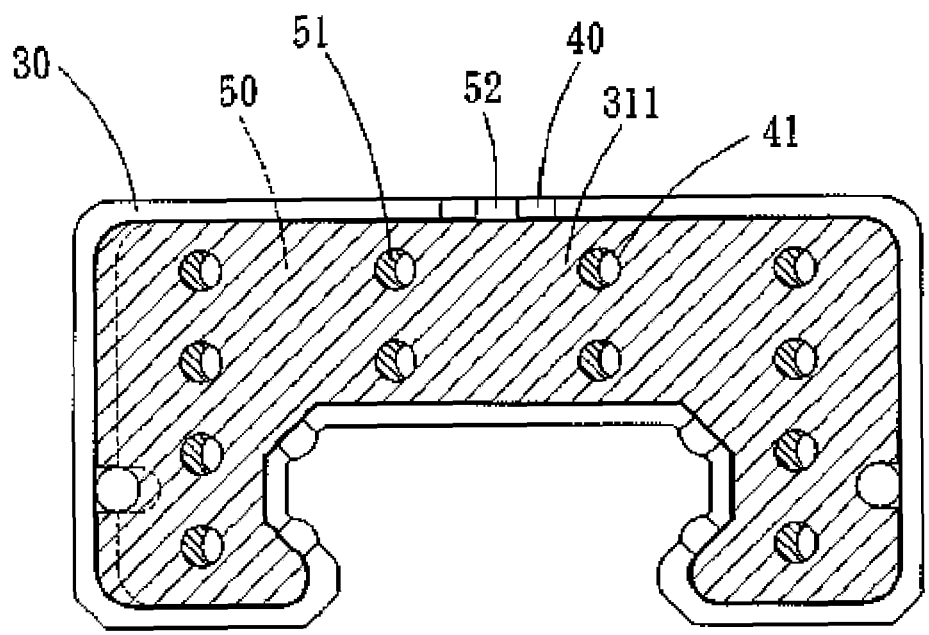
FIG. 8 is a cross sectional view in accordance with the preferred embodiment of the present invention of showing the displacement of the adjusting board.

The foregoing, and additional objects, features and advantages of the present invention will become apparent from the following detailed description of preferred embodiment thereof, taken in conjunction with the accompanying FIGS. 5, 6 and 7.

An adjusting structure for adjusting amount of lubricant applied to a linear guideway is installed on an end of a slide block 20 slideably mounted on a rail 21, which comprises at least one self-lubricating oil tank 30, a lubricating unit 32, a positioning board 40 and at least one adjusting board 50.

The self-lubricating oil tank 30 cooperates with a sealing cover 331 and a wiping board 33 to form an enclosed inner space in which are formed an oil-storage space 31, a bearing seat 35 and a lubricating space 36. The oil-storage space 31 is filled with lubricating oil and is fixed on the end of the slide block 20, at least one sidewall of the lubricating space 36 in the self-lubricating oil tank 30 is defined with a lubricating aperture 34 facing the surface of the rail 21. At least one lubricating unit 32 is disposed in the lubricating space 36. The lubricating unit 32 has a lubricating protrusion 321 that protrudes out of the lubricating aperture 34 and come into contact with the surface of the rail 21. An adjusting slot 311 is formed above the oil-storage space 31.

The positioning board 40 is sealed in the self-lubricating oil tank 30 and positioned on the bearing seat 35 and serves to separate the oil-storage space 31 of the self-lubricating oil tank 30 from the lubricating space 36. A plurality of oil apertures 41 are formed in the positioning board 40 for communicating the oil-storage space 31 with the lubricating space 36.

The adjusting board 50 is slideably disposed in the oil-storage space 31 of the self-lubricating oil tank 30 and is superposed on the positioning board 40. An interval A is left between the adjusting board 50 and the oil-storage space 31. The adjusting board 50 is formed on the top thereof with an adjusting portion 52 that is to be engaged in the adjusting slot 311 of the self-lubricating oil tank 30. And an interval B is left between the adjusting portion 52 and the inner wall of the adjusting slot 311. The adjusting board 50 is also defined with a plurality of oil apertures 51 for communicating the oil-storage space 31 with the lubricating space 36. The oil apertures 51 are shaped and located correspondingly to the oil apertures 41 of the positioning board 40.

When the oil apertures 51 of the adjusting board 50 are fully aligned to the oil apertures 41 of the positioning board 40, the adjusting board 50 will abut against an inner wall of the oil-storage space 31, and the size of the intervals A and B will reach the maximum value.

The method of positioning the adjusting portion 52 in the adjusting slot 311 can be by friction, insertion, or other means, as along as it can prevent the adjusting portion 52 from moving with respect to the adjusting slot 311.

For a better understanding of the embodiment, its operation and function, reference should be made to FIGS. 5-8.

When the demand of lubricating oil applied to the slide block 20 and the rail 21 is high (heavy load), the user can adjust the adjusting portion 52 protruded out of the adjusting slot 311 of the self-lubricating oil tank 30, making the adjusting board 50 abut against the inner wall of the oil-storage space 31, the size of the intervals A and B will reach the maximum value. At this moment, the oil apertures 51 of the adjusting board 50 are fully aligned to the oil apertures 41 of the positioning board 40, so that the lubricating oil in the oil-storage space 31 can be transmitted to the lubricating unit 32 in the lubricating space 36 via the oil apertures 51 and 41. The lubricating protrusion 321 of the lubricating unit 32 will absorb a great amount of lubricating oil out of the lubricating aperture 34 and apply it to the surface of the rail 21. In this way, the amount of lubricating oil applied to the slide block 20 and the rail 21 can be increased precisely.

When the demand of lubricating oil applied to the slide block 20 and the rail 21 is low (light load), the user also can adjust the adjusting portion 52 protruded out of the adjusting slot 311 of the self-lubricating oil tank 30, making the adjusting board 50 not abut against the inner wall of the oil-storage space 31, the size of the intervals A and B will be reduced. At this moment, the oil apertures 51 of the adjusting board 50 are partially overlapped with the oil apertures 41 of the positioning board 40. Although the lubricating oil in the oil-storage space 31 still can be transmitted to the lubricating unit 32 in the lubricating space 36 via the oil apertures 51 and 41, the space of the oil apertures 51 and 41 for allowing passage of the lubricating oil will be reduced. At this moment, the lubricating protrusion 321 of the lubricating unit 32 will absorb a small amount of lubricating oil out of the lubricating aperture 34 and apply it to the surface of the rail 21. In this way, the amount of lubricating oil applied to the slide block 20 and the rail 21 can be reduced precisely, thus effectively saving lubricating oil while improving maintenance period.

It will be noted that the increasingly precise linear guideway requires a more precise lubricant supply structure in order to prevent accumulation of two much lubricating oil between the slide block 20 and the rail 21, since the accumulation of lubricating oil will become greasy dust, causing maintenance problem. Therefore, the present invention is really a brand new practical adjusting structure for adjusting amount of lubricant applied to a linear guideway.

To summarize, the innovative design of the present invention comprises a self-lubricating oil tank, a positioning board and at least one adjusting board. The self-lubricating oil tank is fixed on the slide block, and the self-lubricating oil tank has an oil-storage space and a lubricating unit. The adjusting board and the positioning board are superposed and arranged between the oil-storage space and the lubricating unit. The displacement of the adjusting board can change the size of the aligned apertures of the positioning board and the adjusting board, and can precisely adjust the amount of lubricating oil transmitted from the oil-storage space to the lubricating unit. Therefore, the present invention can use the adjusting board to change the lubricating effect at any time, it not only can save lubricating oil but also can improve the lubricating effect.

While we have shown and described various embodiments in accordance with the present invention, it should be clear to those skilled in the art that further embodiments may be made without departing from the scope of the present invention.

What is claimed is:

1. An adjusting structure for adjusting amount of lubricant applied to a linear guideway, installed at an end of a slide block on a rail, comprising: a self-lubricating oil tank, at least one lubricating unit, at least one positioning board and at least one adjusting board; wherein the self-lubricating oil tank cooperates with a sealing cover to form an enclosed inner space in which are formed an oil-storage space, a bearing seat and a lubricating space, the oil-storage space is filled with lubricating oil, at least one sidewall of the lubricating space in the self-lubricating oil tank is defined with a lubricating aperture facing the surface of the rail, the lubricating unit is disposed in the lubricating space, the lubricating unit has a lubricating protrusion that protrudes out of the lubricating aperture and comes into contact with a surface of the rail;

the positioning board is sealed in the self-lubricating oil tank and positioned on the bearing seat and serves to separate the oil-storage space of the self-lubricating oil tank from the lubricating space, a plurality of oil apertures are formed in the positioning board for communicating the oil-storage space with the lubricating space;

the adjusting board is slideably disposed in the oil-storage space of the self-lubricating oil tank and is superposed on the positioning board, an interval is left between the adjusting board and the oil-storage space, a plurality of oil apertures for in the adjusting board for communicating the oil-storage space with the lubricating space, and the oil apertures are shaped and located correspondingly to the oil apertures of the positioning board.

2. The adjusting structure for adjusting amount of lubricant applied to a linear guideway as claimed in claim 1, wherein an adjusting slot is formed in the self-lubricating oil tank and located above the oil-storage space, the adjusting board is formed on the top thereof with an adjusting portion that is to be engaged in the adjusting slot of the self-lubricating oil tank, and an interval is left between the adjusting portion and the inner wall of the adjusting slot.

3. The adjusting structure for adjusting amount of lubricant applied to a linear guideway as claimed in claim 2, wherein when the oil apertures of the adjusting board are fully aligned to the oil apertures of the positioning board, the adjusting board will abut against a inner wall of the oil-storage space, and the size of the intervals will reach the maximum value.

* * * * *